Nov. 25, 1969   I. B. MEDELL   3,479,670
TUBULAR PROSTHETIC IMPLANT HAVING HELICAL
THERMOPLASTIC WRAPPING THEREAROUND
Filed Oct. 19, 1966
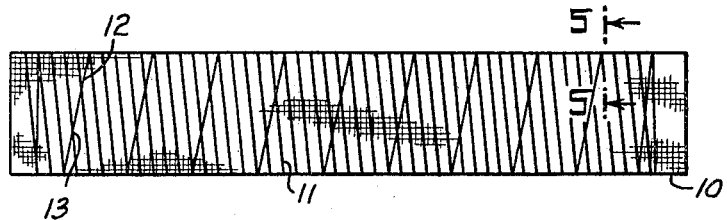
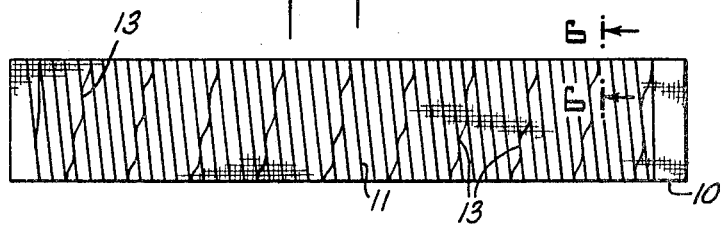
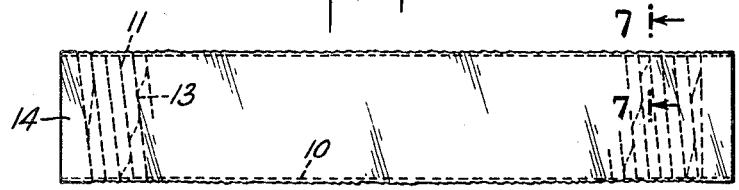
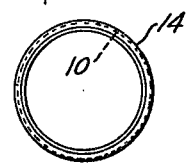
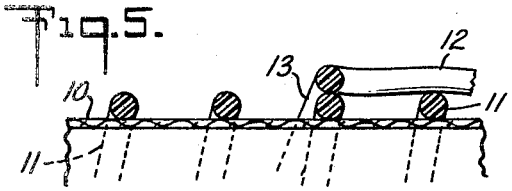
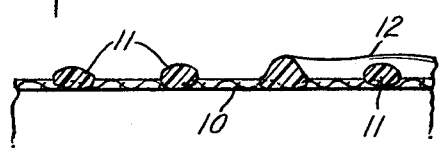
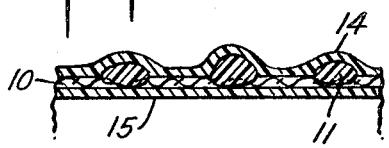
INVENTOR.
IRVING BRIDGMAN MEDELL
BY Robert W. Kell
ATTORNEY

United States Patent Office 3,479,670
Patented Nov. 25, 1969

3,479,670
TUBULAR PROSTHETIC IMPLANT HAVING HELICAL THERMOPLASTIC WRAPPING THEREAROUND
Irving Bridgman Medell, Monmouth Junction, N.J., assignor to Ethicon, Inc., a corporation of New Jersey
Filed Oct. 19, 1966, Ser. No. 588,670
Int. Cl. A61f *1/00;* A61b *17/04;* F16l *11/00*
U.S. Cl. 3—1            4 Claims

ABSTRACT OF THE DISCLOSURE

An open-mesh non-absorbent cylindrical tube is wrapped with two sections of polypropylene monofilament to form a right-hand helix and a left-hand helix along the surface of the tube. This composite structure is heated to the fusion temperature of polypropylene causing the polypropylene monofilaments to fuse into and partially penetrate the exterior surface of the tube and causing the monofilaments to fuse together at the points of intersection. The tubes so obtained are resistant to collapse and kinking and may be coated with a dispersion of collagen fibrils to reduce permeability. The product so obtained has utility as an esophageal graft.

---

The present invention relates to reinforced-fabric, tubular prostheses adapted to be placed permanently in the human body and to a method of making the same. More particularly, this invention relates to tubular prostheses that are reinforced with a fused monofilament having utility in the surgical repair of body ducts, such as, the ureter, the bile duct, the esophagus, and the blood vessels.

Problems have occurred in the use of tubular prostheses to repair vessels and ducts of small diameter, most particularly if there is insufficient pressure within the vessel to maintain an open lumen. A primary problem of esophageal reconstruction is stricture at the anastomosis line after healing. Attempts have been made to avoid the collapse or kinking of such fabric tubes by crimping. While a crimped tube is more flexible than an uncrimped tube and will resist kinking and collapse, these advantages are reduced or eliminated during the healing process as the ingrowth of tissue immobilized the crimp and decreases the flexibility of the prostheses. Moreover, the irregularities of the internal surfaces of the tube produce turbulence and increased resistance to fluid flow.

The present invention has for its principal object the provision of flexible tubes constructed of fabric and reinforced with a polypropylene monofilament that has been fused to united the monofilament and the fabric.

A further object of the invention is the provision of fabric tubes that are not subject to kinking or collapsing in any desired diameter or length suitable for use with human body ducts, arteries, or veins.

It has now been discovered that an improved prosthesis can be constructed using as a framework or support a synthetic fiber having a high melting point, such as Dacron, a fiber made from terephthalic acid and ethylene glycol, or Teflon, a tetrafluoroethylene polymer, both of which are manufactured by E. I. du Pont de Nemours and Company. Dacron or Teflon may be knitted or woven to form a tube having a wide mesh thus permitting easy invasion by the host tissue into the interstices between the non-absorbable fibers. The tube may be made more resistant to collapse and kinking by fusing to the surface of the tube a section of polypropylene monofilament. The polypropylene monofilament is wrapped around the tube and heated to its fusion temperature causing it to fuse into and partially penetrate the exterior surface of the tube. Preferably, the external surface of the tube is wrapped with two sections of thermoplastic monofilament, the first section forming a right-hand helix along the surface of the tube and the second section forming a left-hand helix and intersecting the first section at frequent intervals.

The invention will appear more clearly from the following detailed description when taken in connection with the accompanying drawings, showing by way of example, a preferred embodiment of the inventive idea. Referring now to the drawings, FIGURE 1 is a side elevational view of a reinforced, fabric tube;

FIGURE 2 is a side elevational view of the reinforced fabric tube of FIGURE 1 following heat treatment;

FIGURE 3 is a side elevational view, partly in section, of a reinforced tube coated with collagen;

FIGURE 4 is an end view of the tube illustrated in FIGURE 3;

FIGURE 5 is an enlarged sectional view taken on the line 5—5 of FIGURE 1;

FIGURE 6 is an enlarged sectional view taken on the line 6—6 of FIGURE 2;

FIGURE 7 is an enlarged sectional view taken on the line 7—7 of FIGURE 3; and

FIGURE 8 is an enlarged sectional view of a reinforced fabric tube that has been coated with collagen.

The non-absorbable fabric, either Dacron or Teflon, may be knitted, crocheted, woven, or braided in the shape of a tube, Y-tube, etc. Optionally, a fabric tulle of Dacron or Teflon may be rolled or cut and sewed with suitable thread to form the desired shape. The tube is then wrapped with a low melting, thermoplastic monofilament as shown in the drawings.

Referring now to FIGURE 1, there is shown a knitted fabric tube of Dacron generally indicated at 10 around which is wrapped a first helix of polypropylene monofilament 11. A second section of polypropylene 12 is wrapped around the fabric tube on top of the monofilament 11 to form a second helix, the pitch of which is greater than and opposite to that of the first helix.

After the helical winding of polypropylene has been applied to the fabric tube, the entire assembly is heated in an oven to about 208° C. and maintained at this temperature for about 1 hour. Under these conditions, the polypropylene strands 11 and 12 fuse together at their points of intersection 13, as best indicated in FIGURE 2. The fused polypropylene also penetrates to some extent into the interstices of the fabric 10. When cooled to room temperature, the fabric tube is surrounded by a rigid, integral grid of polypropylene that is united with and supports the fabric tube.

The effect of heating the polypropylene monofilament is best illustrated in FIGURES 5 and 6, which show the appearance of a tube wrapped with polypropylene before and after the heat treatment. The extent to which the filament has fused and has penetrated the fabric of the tube is particularly evident in FIGURE 6.

FIGURE 7 illustrates a section of a reinforced, fabric tube that has been coated on the exterior surface with a layer 14 of collagen or gelatin to render the fabric prosthesis blood tight. Its use as an esophageal graft requires the protein layer to render it impermeable to bacteria, fluids, etc.

FIGURE 8 is a similar view of a prosthesis that has been dipped to apply a coating 14 to the exterior surface of a fabric tube and a coating 15 to the interior surface thereof.

The present invention is more fully described and explained in the following examples. It is to be understood, however, that our invention is not to be limited to any specific form of materials or conditions set forth in the examples, but is limited solely by the description in this specification and the appended claims. Throughout the specification and the examples which follow, all quantities are expressed in parts by weight.

EXAMPLE I

A venous graft is constructed of knitted Dacron with an internal diameter of 5 millimeters. This tube is placed on a Teflon-covered mandrel and is wrapped with a double helix of size 2–0, clear, monofilament polypropylene. The pitch of the helix is not critical but preferably will approximate the diameter of the tube. The Dacron tube with its clear, monofilament, polypropylene, helical overwrap is heated at 208° C. for 1 hour. After cooling at room temperature for ½ hour, the graft is removed from the mandrel.

EXAMPLE II

An esophageal graft is prepared from a knitted Dacron tube. The Dacron tube is placed on a Teflon-covered mandrel and wound with a double helix of 2–0, clear, monofilament polypropylene; the pitch of the helices approximating the diameter of the tube. The Dacron tube is then heated at 208° C. for 1 hour to fuse the polypropylene overwrap. The tube is then cooled to room temperature, and the mandrel is removed.

The reinforced Dacron tube is next immersed in an acidic, aqueous disperson of collagen fibrils prepared as described in Example I of U.S. Patent No. 3,272,204, and a vacuum is applied to the vessel containing the tube and collagen disperson to remove air bubbles trapped in the interstices of the fabric.

The coated fabric tube is removed from the collagen dispersion, and the collagen fibrils are neutralized with a dilute solution of ammonium hydroxide and air dried at room temperature for 24–48 hours. The dried collagen coating is tanned by immersing the coated fabric tube in an aqueous solution containing 0.05 percent by weight formaldehyde for two and one-half hours. The tube is then removed from the tanning bath and dried at room temperature for 24 to 48 hours.

EXAMPLE III

A tubular, arterial graft is constructed of knitted Teflon. The porosity of the knitted fabric is such that 10,000 mls. of water per minute will pass through 1 square centimeter of the fabric under a pressure of 120 millimeters of mercury. The Teflon tube is placed on a mandrel and wound with a double helix of 2–0, polypropylene monofilament. The Teflon tube is then heated at 208° C. to fuse the polyethylene overwrap. The tube is cooled to room temperature, and the mandrel is removed.

The exterior surface of the reinforced Teflon tube is next coated with an acidic aqueous dispersion of collagen fibrils prepared as described in Example I of U.S. Patent No. 3,272,204, and the collagen coating is neutralized, tanned, and dried as described above.

EXAMPLE IV

An esophageal graft is prepared as described in Example II above by substituting Teflon for Dacron in constructing the knitted tube.

While the invention has been described in detail according to the preferred method of carrying out the process and yielding the products, it will be obvious to those skilled in the art, after understanding the invention, that changes and modifications may be made (without departing from the spirit or scope of the invention), and it is intended in the appended claims to cover such changes and modifications.

What is claimed is:
1. A surgical prosthesis comprising:
   an open mesh, non-absorbable, cylindrical tube manufactured of a non-absorbable material selected from the group consisting of tetrafluoroethylene polymer and polyethylene terephthalate; and
   a helical wrapping of polypropylene monofilament around the external wall of the tube, said thermoplastic monofilament being fused and united to the external surface of the tube.
2. The surgical prosthesis of claim 1, wherein the interstices of the fabric are filled with a body-absorbable substance consisting of collagen fibrils, whereby the prosthesis is rendered blood tight.
3. The surgical prosthesis of claim 1, wherein the non-absorbable material is polyethylene terephthalate.
4. The surgical prosthesis of claim 1, wherein the non-absorable material is tetrafluoroethylene polymer.

References Cited

UNITED STATES PATENTS

| | | | |
|---|---|---|---|
| 2,127,903 | 8/1938 | Bowen | 128—334 |
| 3,272,204 | 9/1966 | Artandi et al. | 128—334 |
| 3,317,924 | 5/1967 | Le Veen et al. | 3—1 |

DALTON L. TRULUCK, Primary Examiner

U.S. Cl. X.R.

128—334; 138—125, 129; 156—306, 425